(12) United States Patent
Vogt

(10) Patent No.: US 6,252,727 B1
(45) Date of Patent: Jun. 26, 2001

(54) DEVICE FOR PIVOTING AN OPTICAL APPARATUS AND A FUNCTION CARRIER WITH THE DEVICE, AND A PROFESSIONAL CAMERA WITH A FUNCTION CARRIER

(75) Inventor: Philippe Vogt, Zürich (CH)

(73) Assignee: Arca Swiss International S.A.R.L., Valentin ( * ) Notice: Subject to any disclaimer, the term of this patent is extended or adjusted under 35 U.S.C. 154(b) by 0 days.

(21) Appl. No.: 09/420,288

(22) Filed: Oct. 18, 1999

(51) Int. Cl.[7] ............................. G02B 7/02; G03B 5/46
(52) U.S. Cl. ..................................... 359/827; 396/342
(58) Field of Search ................................. 359/827, 823; 396/342, 419

(56) References Cited

U.S. PATENT DOCUMENTS

| | | | |
|---|---|---|---|
| 4,372,609 | * 2/1983 | Boisset | 297/362 |
| 4,783,673 | * 11/1988 | Vogt | 396/342 |
| 5,380,062 | * 1/1995 | Nania | 297/256.13 |
| 5,809,340 | * 12/1998 | Donner | 396/89 |

FOREIGN PATENT DOCUMENTS

213078 * 3/1987 (CH) ..................... G03B/19/00

* cited by examiner

Primary Examiner—Georgia Epps
Assistant Examiner—Saeed Seyrafi
(74) Attorney, Agent, or Firm—Sidley Austin Brown & Wood, LLP

(57) ABSTRACT

The arrangement comprises guide units (1) having an arcuate groove (4), a pivotal part (2) with arcuate slide runners (14) and means (6) for the adjustment of the width of the groove. In this way a self-locking can be achieved with simple means in advantageous manner. A function carrier for an objective carrier or an image carrier with this arrangement has the advantages of the omission of a setting device for the horizontal pivoting and the associated saving in weight and height in a plate camera and also a wobble-free pivoting of the objective frame and image frame.

9 Claims, 3 Drawing Sheets

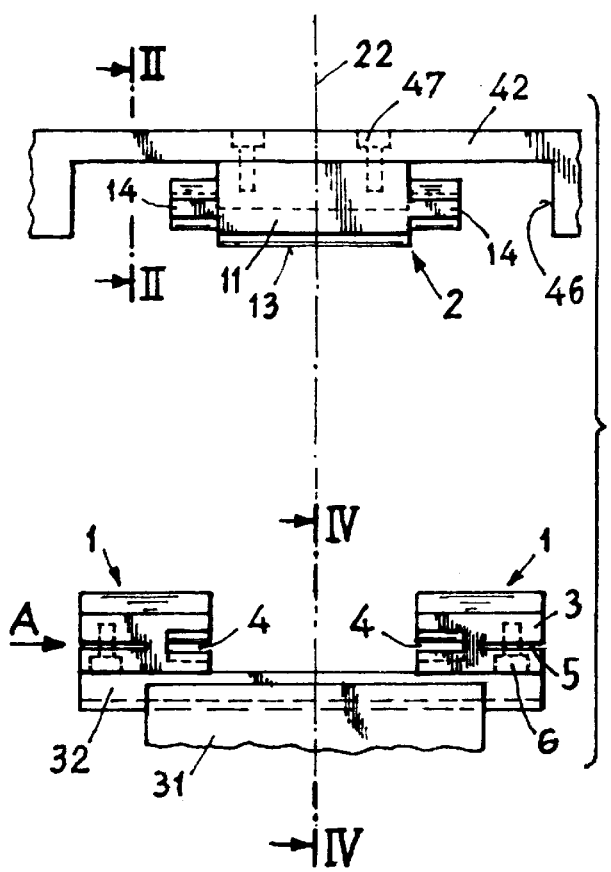
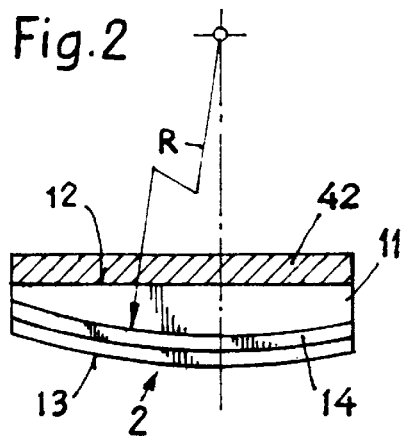
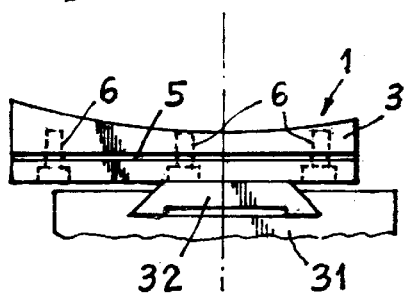
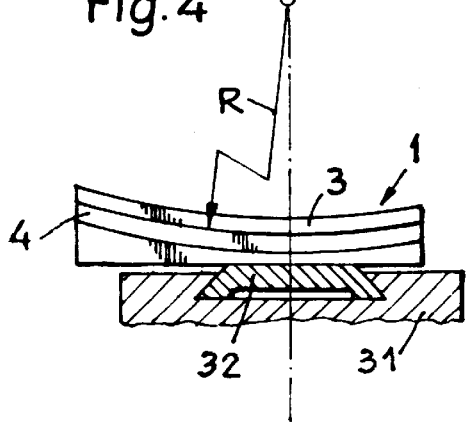

DEVICE FOR PIVOTING AN OPTICAL APPARATUS AND A FUNCTION CARRIER WITH THE DEVICE, AND A PROFESSIONAL CAMERA WITH A FUNCTION CARRIER

BACKGROUND OF THE INVENTION

1. Field of the Invention

The present invention relates to an arrangement for pivoting an objective or image frame and including a guide unit having an arcuate groove, and a pivotable part, in which the objective or image plane is supported and which has an arcuate slide section displaceable in the groove relative to the guide unit. The present invention also relates to a carrier for supporting the objective or image frame with the pivoting arrangement.

2. Description of the Prior Art

In DE-17 72 918 there is described a plate camera with an image frame and an objective frame which can be pivoted about a horizontal axis and about a vertical axis. For this purpose, the plate camera contains an arrangement which consists essentially of a stand, a segment and a cross slide. The support is respectively secured to the frames and determines the vertical pivot axis. The support is journalled in the segment with the aid of a rotary bearing with balls and is movably supported on a cross-slide which is displaceably journalled in a pivotal member and can be locked by means of a clamping device. In the cross-slide there are provided races for balls which extend along circular arcs concentrically about the horizontal pivot axis. The balls roll off on these races so that the smallest possible friction forces are to be overcome. For the pivoting of the image frame about the horizontal pivot axis a mechanism is provided. Instead of the balls, sliding bearings of low friction material can be provided.

The disadvantage of this arrangement is essentially to be seen in the fact that a mechanism is provided for the pivoting about the axis and/or a means is provided for the fixation of the position.

The invention is based on the object of improving an arrangement for the pivoting of an optical apparatus.

SUMMARY OF THE INVENTION

This and other objects of the present invention, which will become apparent hereinafter, are achieved by providing means for adjusting the width of the groove in which the slide section is displaced, and by providing a carrier for an objective or image frame and including means for pivoting the frame about a vertical axis, with the arrangement for pivoting the frame about the horizontal axis being arranged above the means for pivoting the frame about the vertical axis.

The advantages which can be achieved with the invention are to be seen in fact that the arrangement is simply constructed, the space requirement is small and free of servicing and no fixing means is required.

The carrier has the advantages that the arrangement which determines the horizontal pivot axis is arranged above the means which determines the vertical pivot axis so that the objective frame or image frame does not execute any form of wobbling movement during the pivoting about the two axes and so that the constructional height and the weight are reduced by the avoidance of the mechanism for the pivoting.

BRIEF DESCRIPTION OF THE DRAWINGS

The invention will be explained in the following with reference to the accompanying drawings. There are shown:

FIG. 1 a view of an embodiment of an arrangement in accordance with the invention in a drawn-apart representation;

FIG. 2 a section along the line II—II in FIG. 1;

FIG. 3 a view in the direction of the arrow A in FIG. 1;

FIG. 4 a section along the line IV—IV in FIG. 1, and

DETAILED DESCRIPTION OF THE PREFERRED EMBODIMENT

Figure 5:
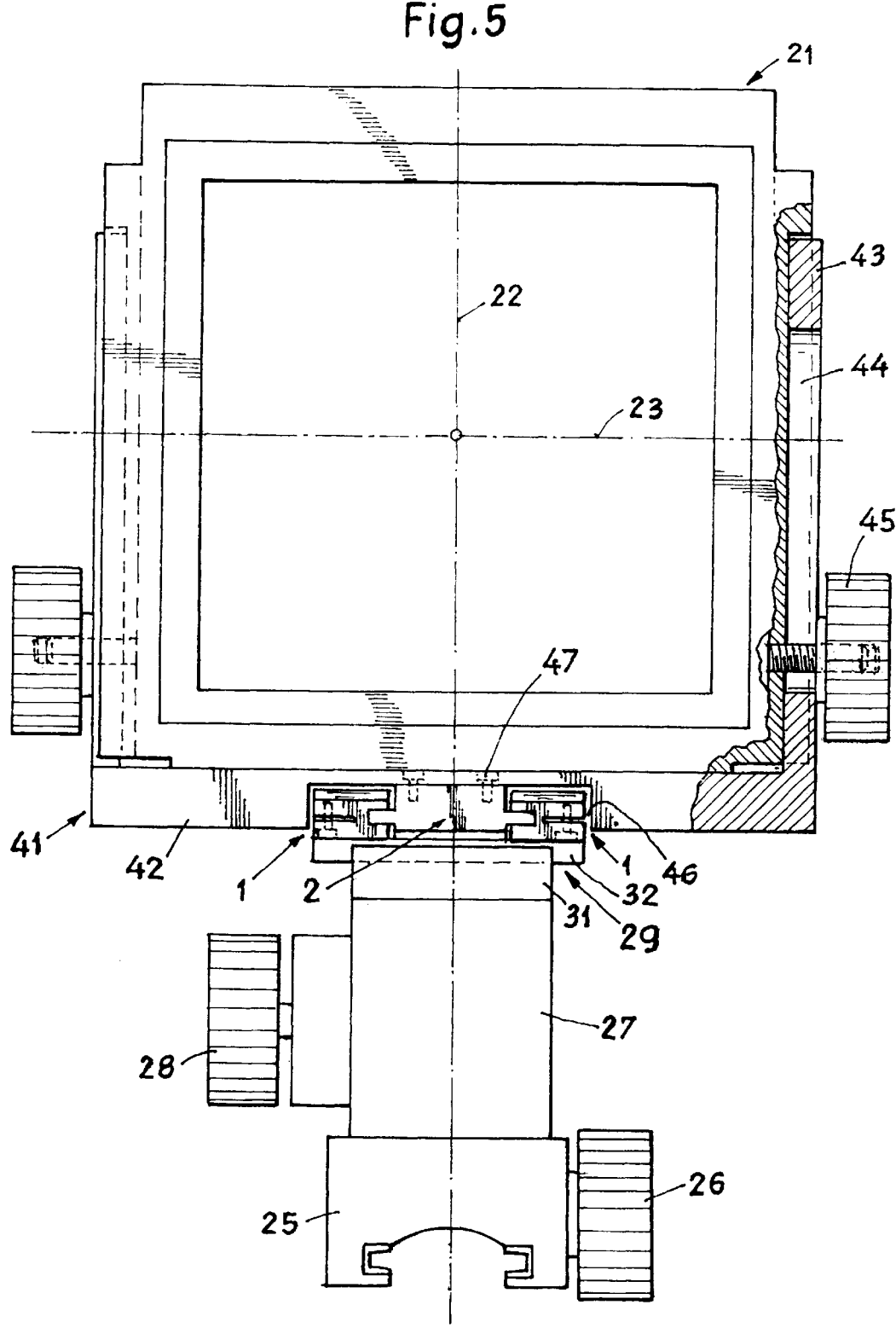
FIG. 5 an embodiment of a carrier in accordance with the invention with an image frame.

Reference is made to the FIGS. 1 and 4. The arrangement under discussion here consists essentially of two guide units 1, a pivotal part 2 and three setting screws 6.

Each guide unit 1 has an elongate body 3 with a planar surface for the attachment of the same and an arcuate surface. The body 3 is provided at one longitudinal side with a groove 4 formed as a circular arc with a radius R which forms two bearing surfaces concentric to the pivot axis and is provided at the other longitudinal side with a straight slot 5. The positioning screws 6 are screwed into the body 3 in the region of the slot 5 and transverse to the latter.

The pivotal part 2 has a elongate central part 11 with a planar surface 12 for the attachment of the same and with an arcuate surface 13 as well as two sliding sections 14 formed as circular arcs with the radius R, which form two bearing surfaces concentric to the pivot axis and project at the longitudinal sides.

The guide units 1 are arranged at a distance from one another on a carrier part 31 and the pivotal part 2 is so arranged between the two guide units that the slide sections 14 engage into the grooves 4. The width of the grooves 4 is adjustable by the setting screws 6 so that the clearance between the concentric bearing surfaces of the groove 4 and of the slide section 14 can be substantially reduced or even eliminated. The clearance can be reduced to such an extent that after being pivoted about a certain angle, the pivotal part 2 would not be able to return to its previous position automatically, under the gravity force, as the walls of the groove 4 would prevent such return movement. In this case, self-locking of the pivotal part 2 in its new pivotal position take place.

FIG. 5 shows a carrier with an image frame 21 which is pivotable about a vertical axis 22 and about a horizontal axis 23 and with the above described arrangement.

The carrier contains, starting from a non-illustrated camera base, a sliding head 25 with a fixation means 26 in order to respectively displace and fix the image frame on the camera base, a means 27 with a fixing device 28 which determines the vertical pivot axis 22 and which is secured to the sliding head 25, a guide 29 which is releasably arranged on the means which determines the vertical pivot axis and the arrangement under discussion here which determines the horizontal pivot axis 23 and which is displaceably arranged in the guide 29 parallel to the horizontal axis 21.

The guide is a dove-tail guide with a guide part 31 of fixed location which is secured to the means 27 and with a movable guide part 32 which is formed as a support for the arrangement and to which the guide units 1 are secured.

The image frame 21 is displaceably arranged in a fork-like holder 41 with a base section 42 and two limbs 43. Elongate holes 44 are formed in the limbs 43. Fixing means 45 are provided which pass through the elongate holes in order to fix the image frame 21 to the holder 41. A recess 46 is formed in the base section 32 for the reception of the arrangement. The arrangement is secured via the pivotal part 2 to the holder 41 by means of screws 46.

Figure 6:
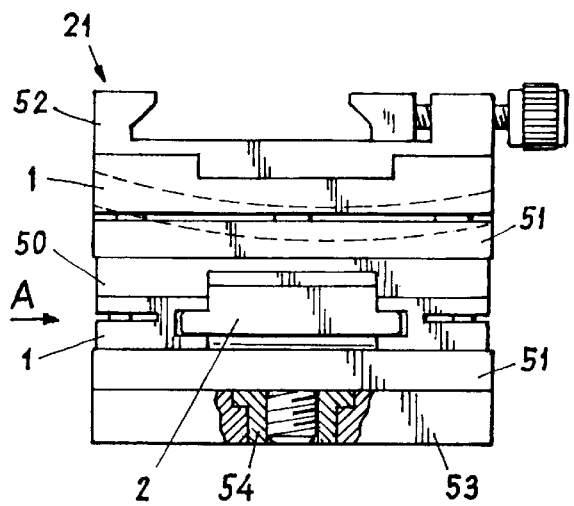
FIG. 6 another embodiment of a carrier in accordance with the invention.
Figure 7:
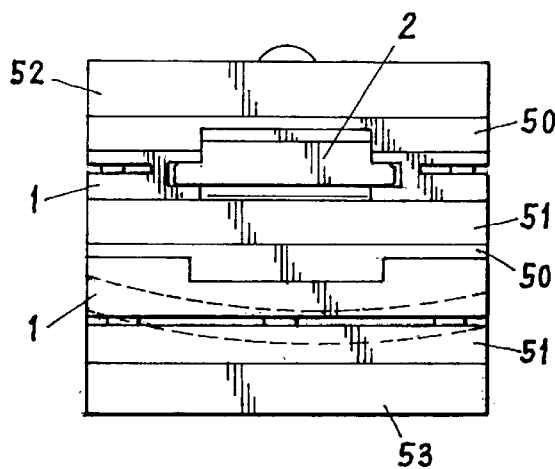
FIG. 7 a view in the direction of the arrow A in FIG. 6.

In the carrier illustrated in FIGS. 6 and 7, two arrangements are provided which are so installed lying on one another that their pivot axes cross each other at an angle of 90°.

Figure 8:
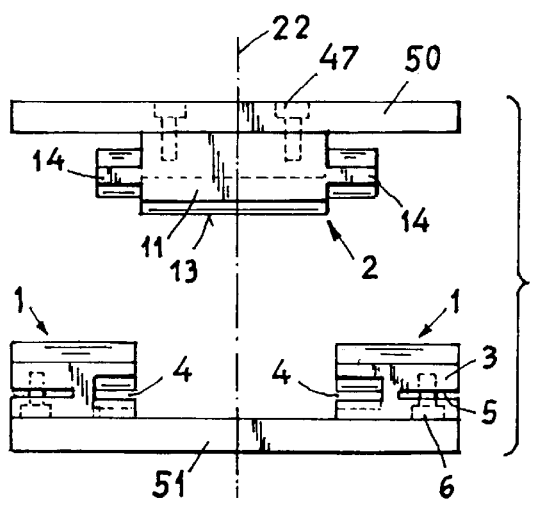
FIG. 8 a view showing an arrangement used in the carrier shown in FIGS. 5–6.

Each arrangement includes two guide units 1 each having an arcuate groove 4 and mounted in spaced relationship to each other on the plates 50, 51, and a pivotal part 2 having an arcuate slide section 14 which is so arranged between the two guide units 1 that it engages in the grooves 4 in such a way that part 2 pivots about the axis 23. For retaining an optical camera, there is provided, on a first arrangement, retaining means 52 that is secured to the pivotal part 2, whereby it can be pivoted about the horizontal axis 23. The base member 53 is designed for securing the carrier 21 on a stative. To this end a sleeve 54 is provided in the base member 53. The sleeve 54 can have an inner thread for adjustably securing the carrier 21. FIG. 8 shows the pivoting arrangement used with the carrier shown in FIGS. 6–7.

A carrier for an objective frame or an image frame with this arrangement has the advantages of the omission of a setting means for the horizontal pivoting, and the associated saving of weight and height in a plate camera, as well as a wobble-free pivoting of the objective frame and image frame.

What is claimed is:

1. An arrangement for pivoting an optical camera about an axis, comprising at least one guide unit including a body having an arcuate groove; a pivotal part having at least one arcuate section receivable in the groove and displaceable therealong relative to the body; and means for adjusting a width of the groove, wherein a clearance between the arcuate section and groove walls can be reduced to an extent such that the pivotal part after being pivoted in a predetermined pivotal position becomes self-locked in the predetermined pivotal position.

2. An arrangement according to claim 1, wherein the body of the guide unit is an elongate body with the arcuate groove being provided on one longitudinal side thereof and with a slot being provided on an opposite side thereof, and wherein the adjusting means comprises at least one adjusting screw extending through the slot and into the groove transverse to a longitudinal extent of the body for changing the groove width.

3. An arrangement according to claim 1, further comprising another guide unit spaced from the at least one guide unit and including a body having an arcuate groove, and wherein the pivotal part is formed as an elongate body provided with two arcuate sections on opposite longitudinal sides thereof and engageable in the arcuate grooves of both guide units.

4. A carrier, comprising two arrangements for pivoting an optical camera and each including at least one guide unit having a body having an arcuate groove; a pivotal part having at least one arcuate section receivable in the groove and displaceable therealong relative to the body; and means for adjusting a width of the groove, wherein a clearance between the arcuate section and groove walls can be reduced to an extent such that the pivotal part after being pivoted in a predetermined pivotal position becomes self-locked in the predetermined pivotal position, wherein the two arrangements are arranged in such a manner that pivot axes thereof cross each other.

5. A carrier for an optical camera frame, comprising a frame holder, means for pivoting the holder with the frame about a vertical axis; and an arrangement for pivoting the frame about a horizontal axis and including at least one guide unit having a body having an arcuate groove; a pivotal part having at least one arcuate section receivable in the groove and displaceable therealong relative to the body; and means for adjusting a width of the groove, wherein a clearance between the arcuate section and groove walls can be reduced to an extent such that the pivotal part after being pivoted in a predetermined pivotal position becomes self-locked in the predetermined pivotal position, wherein the arrangement is disposed above the means for pivoting the frame about a vertical axis.

6. A carrier according to claim 5, wherein the arrangement is located at least partially in the frame holder.

7. A carrier according to claim 5, wherein the frame holder has a base portion, two limbs for adjustably holding the frame, and means for securing the frame in a selected position.

8. A carrier according to claim 5, wherein the holder has a cut-out a center line of which intersects the vertical axis and extends transverse to the horizontal axis, and wherein one of the at least one guide unit and the pivotal part is arranged in the cut-out.

9. A plate camera, comprising an objective or image frame; and frame carrier including a frame holder, means for pivoting the holder with the frame about a vertical axis; and an arrangement for pivoting the frame about a horizontal axis and including at least one guide unit having a body having an arcuate groove, a pivotal part having at least one arcuate section receivable in the groove and displaceable therealong relative to the body, and means for adjusting a width of the groove, whereby a clearance between the arcuate section and groove walls can be reduced to an extent such that the pivotal part after being pivoted in a predetermined pivotal position, becomes self-locked in the predetermined pivotal position, wherein the arrangement is disposed above the means for pivoting the frame about a vertical axis.

* * * * *